April 9, 1968

J. TLUSTÝ ETAL 3,376,770

TAILSTOCK FOR MACHINE TOOL

Filed May 23, 1966

INVENTORS
Jiří Tlustý, Miloš Poláček,
Lubor Pluhař, Oldřich Maryška
By Richard Low Agt United States Patent Office 3,376,770
Patented Apr. 9, 1968

3,376,770
TAILSTOCK FOR MACHINE TOOL
Jiří Tlustý, Miloš Poláček, Lubor Pluhař, and Oldřich Maryška, Prague, Czechoslovakia, assignors to Vyzkumny ustav obrabecich stroju a obrabeni, Prague, Czechoslovakia
Filed May 23, 1966, Ser. No. 551,988
Claims priority, application Czechoslovakia, May 24, 1965, 3,368/65
4 Claims. (Cl. 82—31)

This invention relates to machine tools, and particularly to an improved tailstock for a lathe and the like.

Unless the tailstock of a lathe has proper rigidity, the combined stresses applied to the workpiece by the rotary movement of the chuck and the radial cutting engagement of the tool causes vibrations which absorb energy, reduce useful tool life, and impair the quality of the cut work surface.

The object of the invention is the provision of a tailstock arrangement in which such vibrations are prevented or impeded, thereby permitting higher rates of tool advance and higher rotary speeds of the workpiece without increases in the power required for operating the lathe or similar machine tool as compared to a conventional, otherwise corresponding machine tool.

The cutting edge of the tool and the axis of rotation of the lathe which passes through the point center on the tailstock define a plane through the axis of rotation of the lathe and a second plane perpendicular through the first plane in the axis, whereby four quadrants about the axis are defined. Two of these quadrants are on the underside of the first-mentioned plane, if the axis is horizontal, and remote from and near the cutting edge respectively. The body of the tailstock and its supporting structure, such as the machine bed and the tailstock slide are normally arranged in the two quadrants on the underside of the first plane.

In order to prevent the afore-mentioned vibrations, the tailstock of the invention is resiliently connected to the supporting structure in the quadrant remote from the cutting edge of the tool, and rigidly connected to the supporting structure in the quadrant near the cutting edge.

The exact nature of this invention as well as other objects and advantages thereof will be readily apparent from consideration of the following specification relating to the annexed drawing in which.

Figure 1:
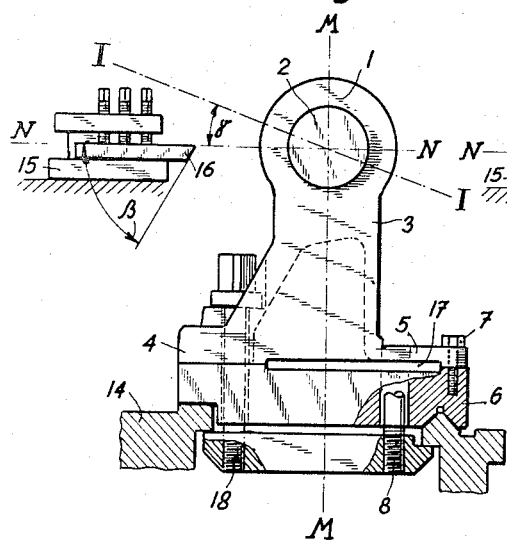
FIG. 1 shows a turning lathe of the invention in fragmentary rear elevation.

Referring initially to FIG. 1, there is shown a tailstock arrangement in which a point center 2 of circular cross section is mounted in a sleeve 1 at the top of the tailstock body 3 fixedly fastened to or integral with a base 4 arranged on a slide 6. The devices which permit axial adjustment of the point center 2 in the sleeve 1 and transverse adjustment of the base 4 on the slide 6 have not been illustrated since they are not directly relevant to this invention. The slide 6 is axially guided on the bed 14 of the lathe by engagement of the bed with a groove in the bottom face of the slide. A tool slide 15 carries a cutting tool 16 and is mounted on the lathe bed in a known manner not further illustrated for feeding movement of the cutting edge of the tool in a plane N—N which passes through the axis of the point center.

The plane N—N, which is horizontal in the illustrated lathe, and a plane M—M perpendicular to the plane N—N in the axis of the point center 2 define four quadrants. The two quadrants under the plane N—N hold the tailstock body 3 and the supporting structure including the lathe bed 14. The slide 6 and the tailstock body 3 are fixedly fastened to the lathe bed in the illustrated operative position of the lathe by a threaded stud 18 in the quadrant near the tool 16 and a nut which permit the usual adjustments of the tailstock when the nut is loosened.

The opposite faces of the tailstock base 4 and of the slide 6 are recessed to define a cavity 17 on both sides of the plane M, and the portion 5 of the base 4 which partly overlies the cavity 17 and partly abuttingly engages a corresponding portion of the slide 6 is thin enough so as to be resilient. The abutting parts of the base portion 4 and of the slide 6 are fastened to each other by screws 7, and a threaded pin 8, only partly shown, fastens the slide 6 to the lathe bed in the quadrant under the plane N—N which is remote from the tool 16.

Because of the resiliency of the portion 5 of the tailstock base, the rigidity of the tailstock is at a minimum in an axial plane I—I which is offset from the plane N—N by an acute angle γ. The plane I—I does not intersect the acute angle β enclosed by the plane N—N and the direction of the cutting force P exerted by the work piece on the tool 16. The tendency of the tailstock assembly to vibrate is reduced to a minimum under these conditions.

The required resilience of the abutment portion 5 of the base 4 is not great enough to cause a significant amount of taper on the workpiece that is being machined, and can be adjusted by the pin 8 which will be understood to carry a non-illustrated nut in the same manner as the stud 18. A desired prestress may therefore be established and maintained in the resilient base part 5.

Figure 2:
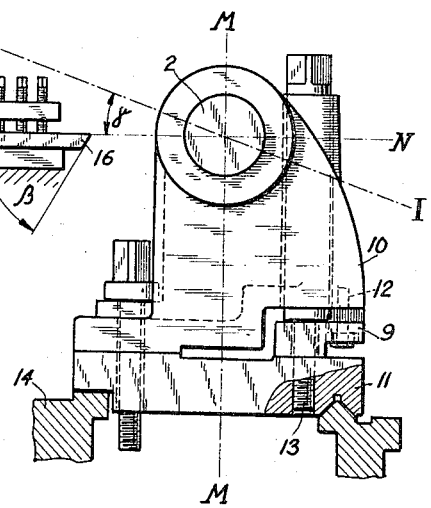
FIG. 2 shows another lathe in a view corresponding to that of FIG. 1.
Figure 3:
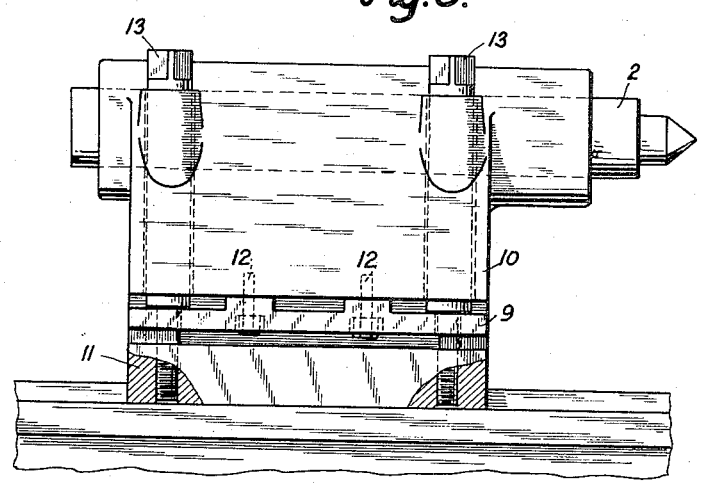
FIG. 3 illustrates the lathe of FIG. 2 in side elevation.

A separate resilient element 9 is interposed between the tailstock body 10 and the tailstock slide 11 in the lathe of the invention partly shown in FIGS. 2 and 3. The base of the tailstock is fixedly and rigidly fastened to the slide 11 by studs 8' and nuts near the cutting tool 16. The portion of the tailstock base farthest removed from the tool 16 is attached to one terminal portion of the resilient metal element 9 by screws 12 whereas another portion of the same element is attached to the slide 11 by screws 13 which permit relative movement of the tailstock body 10 and the resilient element 9.

The material and the dimensions of the element 9 are chosen so that the axial plane I—I of minimum tailstock rigidity is angularly offset from the plane N—N, and the plane I—I does not intersect the angle defined by the plane N—N and the direction of the cutting force P exerted on the tool 16.

Pneumatic or hydraulic springs may be substituted for the resilient metal element 9 in an obvious manner to achieve any desired degree of resiliency. It will also be appreciated that the resilient element may be placed anywhere between the tailstock body and the rigid machine frame to achieve the same absence of vibrations at relatively high rates of advance of the tool 16 and at relatively high rotary speeds of the non-illustrated workpiece which are not available with otherwise comparable known tailstocks not equipped with resilient means for maintaining the axial plane of minimum rigidity in the desired angular relationship to the planes and directions defined by the tool. The axial plane of maximum rigidity or stiffness of the tailstock, not shown in the drawing, is perpendicular to the plane I—I.

Because of the absence of vibrations in lathes of the invention, they produce machined workpieces of excellent surface properties and permit an extended useful life of the tool 16 before regrinding is necessary. This is achieved without obstructing free access of the tool 16 to the workpiece, as is needed for machining workpieces of relatively small diameter.

The tailstocks of the invention permit the energy supplied by a drive motor which rotates the non-illustrated workpiece to be fully utilized for the cutting of the workpiece whereas as much as ⅔ of the motor power may be consumed by vibrations in otherwise similar known tailstocks.

It should be understood of course, that the foregoing disclosure relates only to a preferred embodiment of the invention, and that it is intended to cover all changes and modifications of the examples of the invention chosen for the purpose of the disclosure which do not constitute departures from the spirit and scope of the invention set forth in the appended claims.

What is claimed is:
1. In a machine tool, in combination:
 (a) a support;
 (b) a tailstock;
 (c) means defining an axis of rotation through said tailstock;
 (d) a tool having a cutting edge, said edge and said axis defining a first plane through said axis and a second plane perpendicular to said first plane in said axis,
  (1) said planes defining therebetween four quadrants about said axis,
  (2) two of said quadrants being on the same side of said first plane and respectively remote from and near said cutting edge,
  (3) said support and said tailstock each having respective first portions in said remote quadrant and respective second portions in said near quadrant;
 (e) first connecting means resiliently connecting said first portions; and
 (f) second connecting means fixedly connecting said second portions.

2. In a machine tool as set forth in claim 1, said support including a machine bed and a slide mounted on said bed for axial movement, one of said first portions being yieldably resilient and constituting an element of said first connecting means.

3. In a machine tool as set forth in claim 1, said first connecting means including a yieldably resilient connecting member having two portions spaced in a direction transverse of said axis and respectively fastened to said support and to said tailstock.

4. In a machine tool as set forth in claim 1, said tailstock having a base portion and a body portion interposed between said base portion and said axis, said first connecting means including cooperating abutment means on said base portion and on said support respectively, one of said abutment means being yieldably resilient.

References Cited

FOREIGN PATENTS 535,962   4/1941   Great Britain.

LEONIDAS VLACHOS, *Primary Examiner.*